Jan. 7, 1947.  G. F. JEROME  2,413,712
POULTRY PICKING APPARATUS
Filed Nov. 13, 1944
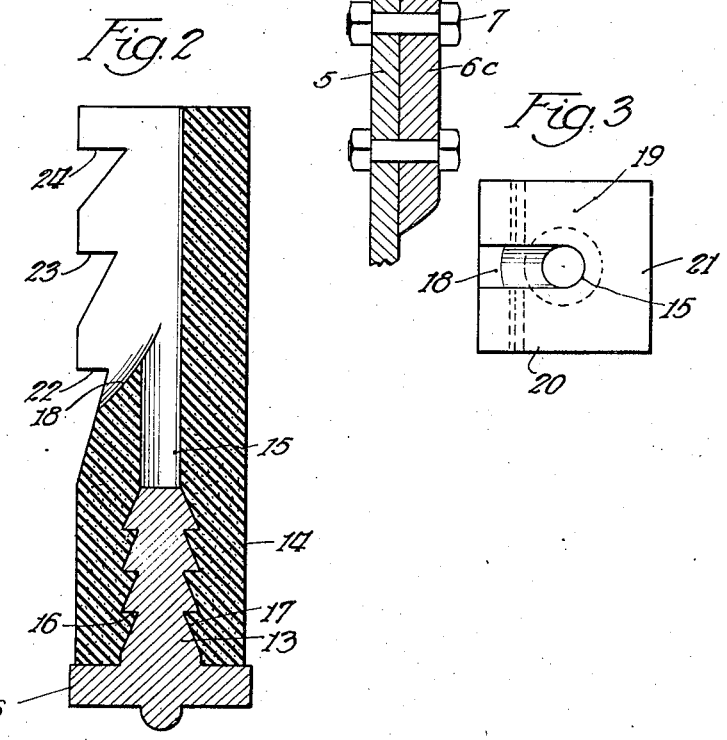
Inventor
George F. Jerome.

Patented Jan. 7, 1947

2,413,712

UNITED STATES PATENT OFFICE 2,413,712

POULTRY PICKING APPARATUS

George F. Jerome, Fort Wayne, Ind.

Application November 13, 1944, Serial No. 563,184

12 Claims. (Cl. 17—11.1)

The present invention relates to the plucking or feather-removing units of a poultry-picking machine. These units are commonly referred to as "picking fingers" and, preferably, they are made of rubber, either natural or synthetic, so that they have considerable resilience. It is the principal purpose of my invention to provide a picking finger and a mounting therefor whereby I am able to get a large number of effective feather removing projections upon the working part of a picking finger.

It is the common experience of those familiar with the art of picking poultry by means of rotating picking fingers that it is necessary to have shoulders or projections along the surfaces of the fingers that engage the feathers on the fowl. My invention contemplates the provision of a picking finger which is so shaped at its base that it can be mounted on a supporting member against a shoulder to prevent rotation of the finger. This picking finger is then shaped up to a substantially U-shape toward its top so as to get the advantage of a multiplicity of feather-engaging projections without sacrificing the strength of the finger.

It is also a purpose of my invention to provide a novel assembly of picking fingers for better handling.

The detailed features and advantages of the invention will appear more fully from the following description, reference being made to the accompanying drawing wherein a preferred form of the invention is shown. It is to be understood, however, that the drawing and description are illustrative only and are not to be taken as limiting the invention except insofar as it is limited by the claims.

In the drawing:

Fig. 1 is a transverse sectional view through a portion of a poultry-picking machine embodying my invention;

Fig. 2 is a longitudinal sectional view through the picking finger employed, the view being taken on the line 2—2 of Fig. 1, and Fig. 3 is a plan view of the picking finger.

Referring now in detail to the drawing, this invention is an improvement upon the poultry-picking machine shown in my prior co-pending application, Serial No. 374,271, filed January 13, 1941, for Poultry-picking machine. In that machine, the multiplicity of picking fingers are carried upon oppositely extending bars that are mounted upon a supporting disk. The disk is, of course, driven by a suitable power source.

In Figure 1, I show a disk 5, upon which I mount a cast bracket 6 which is provided with oppositely extending arms 6a and 6b. The bracket 6 has a lug 6c which is secured to the disk 5 by suitable bolts 7. Each of the arms is provided with a series of stepped faces 8, 9, 10, 11 and 12, which provide seats for a series of picking fingers 14. The picking fingers are rectangular in cross-section and it will be noted that there is an adjacent shoulder alongside each of the faces 8 to 12 inclusive and there is a projecting peg 13 on each of the faces 8 to 12 on which the fingers 14 are mounted. As shown best in Figure 2, the finger 14 has an aperture 15 extending up from the bottom thereof. This aperture is provided with segments 16 which engage in grooves or annular recesses 17 cut in the pegs 13, when the fingers are forced on to the pegs, to fasten the fingers on the pegs.

It will be noted that the seats 8 to 12 inclusive are set at different levels with respect to the disk 5 so that a line drawn along the tops of the picking fingers 14 describes an arc of a circle. I find that this is quite useful in the poultry-picking machine, as the fowl body fits into this curved contour more readily than it fits against a straight cylinder such as is commonly found in picking machines.

Referring now to the picking finger 14, this finger is provided with a channel at 18 extending into the aperture 15 and extending downwardly from the top of the picking finger to a short distance above the end of the peg 13. The extent of the channel 18 is shown clearly in Figure 2. This channel divides the working end of the finger into two parallel sections 19 and 20, backed up by a solid wall section 21. In order to take advantage of both sections 19 and 20 to provide picking projections, I notch both sections with notches 22, 23 and 24. The notch 22 is of relatively short depth. Notch 23 is of still greater depth, and notch 24 is deeper than the notch 23. The critical cross-section of the finger thus increases from the picking end toward the base, and when stress is applied, the finger bends along a smooth curve from the end of the peg 13 to the tip of the finger. The greatest thickness of material, and thus the greatest strength, exists at the tip of the peg 13. The flexing of the finger must take place from this point to the tip of the finger. The opening of the channel 18 at some distance above the tip of the peg 13 gives adequate strength to the finger at the critical point.

I have found that a much better picking operation can be obtained by providing feather-engaging projections that are larger and more numerous. It has been proposed to provide tubular fingers with closely spaced annular ribs, but this does not provide projections that are of the right shape to accomplish my result. As shown in the drawing, I have six projections on each finger, and each projection is relatively narrow crosswise of the finger. The projections are farther apart lengthwise of the finger than their width. The projections, therefore, are capable of entering small indentations such as are found on the wings and legs of the fowl, due to the transverse action of each channel wall under pressure.

From the foregoing description, it is believed that the nature and advantages of my invention will be clear to those skilled in this art.

Having thus described my invention, what I claim as new and desire to secure by Letters Patent is:

1. A picking finger assembly for poultry picking machines, comprising in combination a support, a series of finger mounting members thereon and resilient fingers secured to said members, each finger having its free end offset lengthwise with respect to adjacent fingers so that a line joining the tips of the fingers describes a curve with the convex side toward the fingers.

2. A picking finger assembly for poultry picking machines, comprising in combination a support, a series of finger mounting members thereon and resilient fingers secured to said members, said support having said members mounted thereon in stepped relation whereby to position the tips of said fingers on a curved line.

3. A picking finger assembly for poultry picking machines, comprising the combination with a supporting disk of arms extending in opposite directions from said disk, said arms also curving in a radial direction away from said disk, and picking fingers mounted on said arms.

4. A picking finger assembly for poultry picking machines, comprising the combination with a supporting disk of arms extending in opposite directions from said disk, said arms also curving in a radial direction away from said disk, and picking fingers mounted on said arms, the arms having flat faces with finger securing means thereon and guide shoulders alongside said faces to prevent turning of the fingers.

5. A picking finger assembly for poultry picking machines, comprising an elongated resilient body, means to mount one end of the body on a support, the other end of the body having narrow feather engaging sections spaced longitudinally of the finger and extending toward the secured end.

6. A picking finger assembly for poultry picking machines, comprising an elongated resilient body, means to mount one end of the body on a support, the other end of the body having a channel extending longitudinally of the finger in the feather engaging face thereof dividing the feather engaging part of the finger into separate picking surfaces.

7. A picking finger for poultry picking machines, comprising an elongated resilient body, means to mount one end of the body on a support, the other end of the body having spaced longitudinally running narrow feather engaging sections extending toward the secured end, the sections being notched transversely on their working faces.

8. A picking finger of resilient material, comprising a tubular mounting section interiorly ribbed to receive a mounting peg, and a picking section projecting outwardly from the mounting section, said picking section being channel shaped in cross section.

9. A picking finger of resilient material, comprising a tubular mounting section to receive a mounting peg, and a picking section projecting outwardly from the mounting section, said picking section being channel shaped in cross section, the channel walls being notched.

10. A picking finger for poultry picking machines, comprising an elongated resilient body, means to mount one end of the body on a support, said body having its working face divided longitudinally and transversely into a plurality of spaced apart projections for engaging the body of a fowl.

11. A picking finger for poultry picking machines, comprising an elongated resilient body, means to mount one end of the body on a support, said body having its working face divided longitudinally and transversely into a plurality of spaced apart projections, said projections being of greater depth toward the free end of the finger.

12. In a poultry picking machine, a resilient picking finger, a mounting peg for the finger having recesses therein between its ends, said finger having a tubular mounting section with internal projecting segments engaged in said recesses to fasten the finger in place, said finger having a picking section extending from said mounting section, the picking section having a front wall provided with relatively large spaced projections and a substantially smooth back wall.

GEORGE F. JEROME.